United States Patent
Harris

(10) Patent No.: US 9,174,812 B2
(45) Date of Patent: Nov. 3, 2015

(54) SYSTEM FOR DELIVERING SOLID PARTICULATE MATTER FOR LOADING

(71) Applicant: Jack Harris, Baton Rouge, LA (US)

(72) Inventor: Jack Harris, Baton Rouge, LA (US)

(*) Notice: Subject to any disclaimer, the term of this patent is extended or adjusted under 35 U.S.C. 154(b) by 128 days.

(21) Appl. No.: 14/058,845

(22) Filed: Oct. 21, 2013

(65) Prior Publication Data

US 2015/0110565 A1 Apr. 23, 2015

(51) Int. Cl.
| | |
|---|---|
| B65G 53/12 | (2006.01) |
| B65G 69/18 | (2006.01) |
| B65G 53/34 | (2006.01) |
| B65G 53/60 | (2006.01) |
| B65G 53/40 | (2006.01) |

(52) U.S. Cl.
CPC .............. *B65G 69/182* (2013.01); *B65G 53/34* (2013.01); *B65G 53/40* (2013.01); *B65G 53/60* (2013.01)

(58) Field of Classification Search
USPC .......... 406/12, 127, 146, 164, 171, 172, 175; 414/291; 141/93; 222/442, 630, 189.09
See application file for complete search history.

(56) References Cited

U.S. PATENT DOCUMENTS

| | | | | | |
|---|---|---|---|---|---|
| 2,176,891 | A | * | 10/1939 | Crom | 264/31 |
| 2,754,155 | A | * | 7/1956 | Kemthorne et al. | 406/12 |
| 3,480,330 | A | * | 11/1969 | Hirs et al. | 406/172 |
| 4,095,625 | A | * | 6/1978 | Marpe | 141/93 |
| 4,314,669 | A | * | 2/1982 | Moos | 239/1 |
| 4,391,860 | A | * | 7/1983 | Rotolico et al. | 427/446 |
| 4,465,016 | A | * | 8/1984 | Weber | 118/303 |
| 4,500,038 | A | * | 2/1985 | De Ferrari et al. | 239/85 |
| 4,815,414 | A | * | 3/1989 | Duffy et al. | 118/308 |
| 4,824,295 | A | * | 4/1989 | Sharpless | 406/109 |
| 5,006,018 | A | * | 4/1991 | Depew | 406/18 |
| 5,114,685 | A | * | 5/1992 | Sapoff | 422/219 |
| 5,503,198 | A | * | 4/1996 | Becker | 141/67 |
| 5,531,252 | A | * | 7/1996 | Derby et al. | 141/67 |
| 5,649,338 | A | * | 7/1997 | Kato | 15/304 |
| 6,068,429 | A | * | 5/2000 | Schultheis | 406/172 |
| 6,325,572 | B1 | * | 12/2001 | Dietrich | 406/171 |
| 6,358,401 | B1 | * | 3/2002 | Evans | 208/152 |
| 6,413,020 | B1 | * | 7/2002 | Davison | 406/168 |
| 6,419,425 | B1 | * | 7/2002 | Fourcroy et al. | 406/120 |
| 6,736,171 | B2 | * | 5/2004 | Harris | 141/67 |
| 6,890,129 | B2 | * | 5/2005 | Fabbri | 406/106 |
| 7,300,521 | B2 | * | 11/2007 | Bowman et al. | 118/308 |
| 7,407,346 | B2 | * | 8/2008 | McConnell | 406/171 |
| 7,635,011 | B2 | * | 12/2009 | Harris | 141/93 |
| 8,061,295 | B2 | * | 11/2011 | Zimmerman et al. | 118/308 |
| 2003/0217783 | A1 | * | 11/2003 | Harris | 141/67 |

(Continued)

*Primary Examiner* — Joseph Dillon, Jr.
(74) *Attorney, Agent, or Firm* — Keaty Law Firm

(57) ABSTRACT

An assembly for transferring solid particulate matter has a pressurized vessel for retaining a pre-determined quantity of the solid material. A transfer conduit connected to the vessel carries the solid material to a loading vessel, be it a processing tank, a storage vessel, or any other similar container. A discharge nozzle carried by a distant end of the transfer conduit is connected to a vacuum source, whereby a slight vacuum is created at the discharge opening. A separate dust removal conduit is secured immediately adjacent to the discharge nozzle for removal of the dust particles away from the discharge nozzle. The dust particles are collected in a separate vessel, which is mounted in a flow of air from the dust collection conduit and an exhaust fan. Mesh sleeves suspended in the vessel, capturing the dust particles on exterior surface thereof. Periodically, the dust particles are dislodged from the sleeves by blowing air through the sleeves. The dislodged dust particles are collected for disposal or recycling.

16 Claims, 2 Drawing Sheets

(56) References Cited

U.S. PATENT DOCUMENTS

| | | | |
|---|---|---|---|
| 2004/0035091 A1* | 2/2004 | Wang | 55/283 |
| 2005/0005866 A1* | 1/2005 | Bondarenko et al. | 119/53 |
| 2006/0039762 A1* | 2/2006 | Ziwica | 406/93 |
| 2007/0267091 A1* | 11/2007 | Harris | 141/65 |
| 2009/0162150 A1* | 6/2009 | Dietrich | 406/171 |
| 2010/0296880 A1* | 11/2010 | Sundholm | 406/48 |
| 2012/0138191 A1* | 6/2012 | Harris | 141/93 |
| 2012/0201614 A1* | 8/2012 | Sundholm | 406/168 |

* cited by examiner

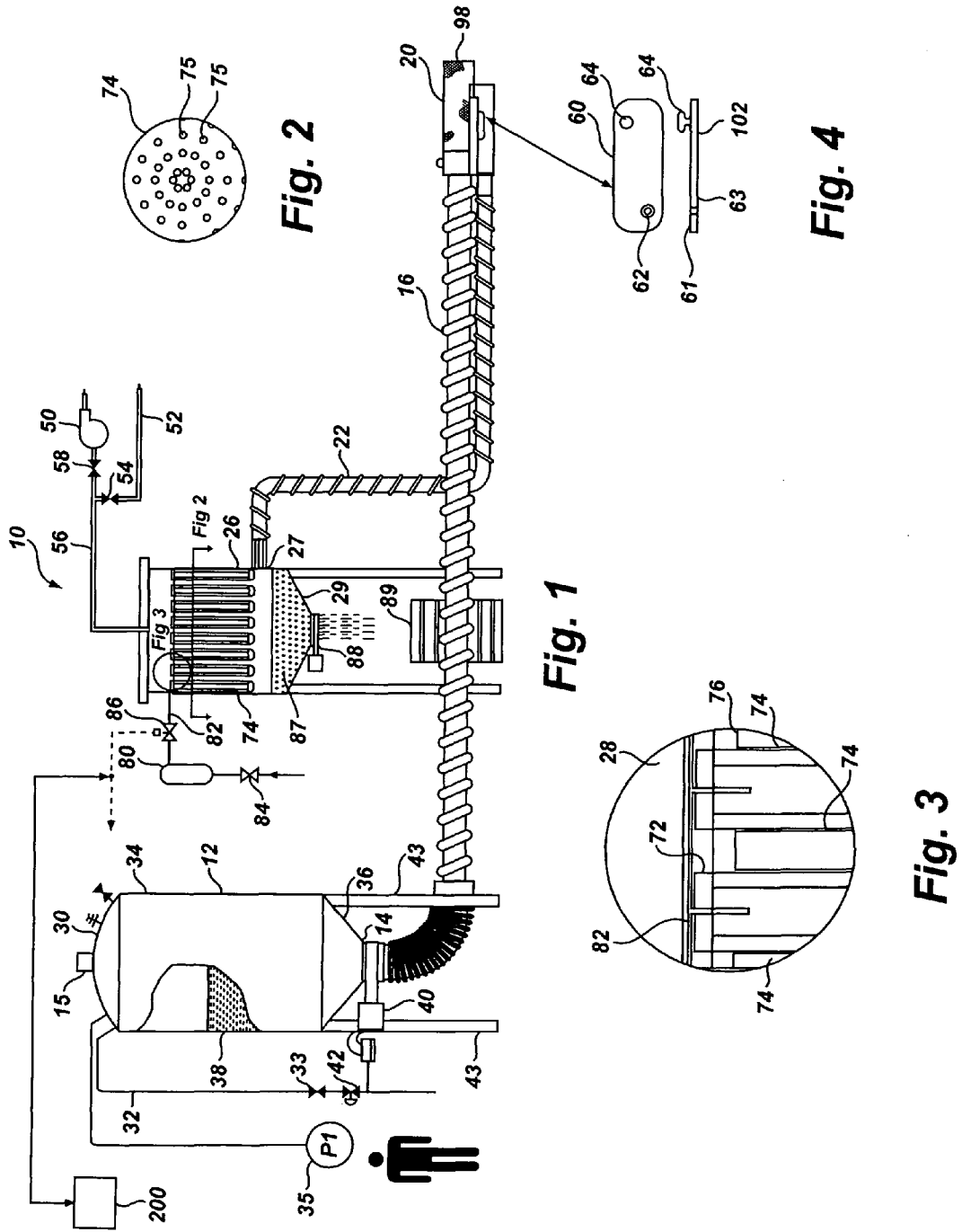

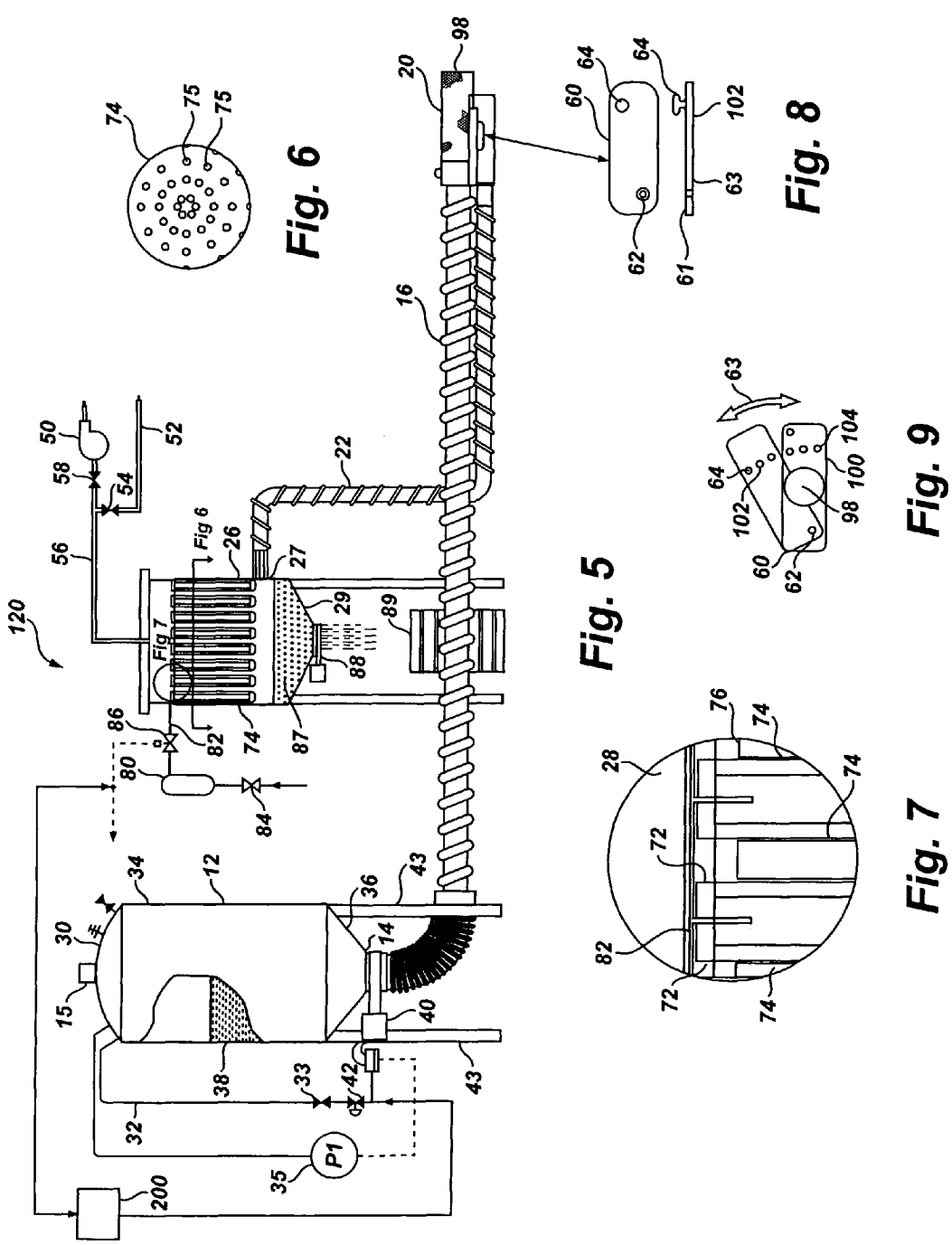

SYSTEM FOR DELIVERING SOLID PARTICULATE MATTER FOR LOADING

CROSS-REFERENCE TO RELATED APPLICATIONS

This application is a divisional application of my application Ser. No. 12/928,132 filed on Dec. 3, 2010 entitled "A System for Delivering Solid Particulate Matter for Loading" (abandoned), the full disclosure of which is incorporated by reference herein, and priority of which is hereby claimed.

BACKGROUND OF THE INVENTION

This invention relates to an assembly for transferring solid particulate matter, with the assistance of pressurized airflow into a loading container, which may be a storage container, a processing tank, or other similar vessel. Even more particularly, the present invention relates to an assembly for transferring solid pelletized material, such as for instance a catalyst substance, into a loading container, wherein the pelletized material generates dust during the transfer process.

Many industries require transport, or delivery of solid particles from storage area or delivery container into another storage container or a processing tank. One of such industries is a chemical industry where pre-determined quantities of solid pellets are loaded into a processing vessel or converter. For instance, sulfuric acid manufacturing plants use a vanadium catalyst, which is supplied in a pelletized form in bags or drums. The catalyst pebbles then need to be loaded into the converter or container where a chemical reaction for generation of gases takes place.

Conventionally, acid processing tanks are upright vessels with a closed top. A plurality of levels or beds of catalyst is contained in each converter vessel. The loading takes place through the top of the converter in the first bed of catalyst and through opening in the sidewall of the converter in lower beds. During the loading operation, the catalyst pellets, being delivered by gravity, generate a significant amount of dust. The personnel who perform the loading operation, by necessity have to wear facemasks, respirators, and similar protective gear to avoid breathing in the dust that heavily permeates the area where the loading takes place.

Similar conditions exist in loading operations of other solid particles, for instance, during grain loading into silos and other storage facilities. The loading space has to be equipped with adequate ventilation to minimize the dust particles retention in the loading area and creation of health hazards in such areas.

A useful assembly for handling solid particulate matter is disclosed in U.S. Pat. No. 7,635,011, which teaches the use of a pressurized vessel for retaining a pre-determined quantity of the solid material. A transfer conduit connected to the vessel carries the solid material to a loading vessel, be it a processing tank, a storage vessel, or any other similar container. A discharge nozzle carried by a distant end of the transfer conduit has a plurality of perforations that allow removal of the dust particles by suction from the discharge nozzle. A separate dust removal conduit is secured immediately adjacent to the discharge nozzle for removal of the dust particles away from the discharge nozzle. The nozzle is also connected to a dust collection container. A vacuum-assisted suction force is created in the dust collection container to facilitate entrapment of dust particles generated during transfer of the solid material through the discharge container and carrying of the dust particles away from the discharge opening of the discharge nozzle into the dust collection container.

While the assembly according to the '011 patent works satisfactory in many circumstances, there was observed a need for a better control of the transfer process for moving the solid particulate matter through the transfer conduit. Additionally, it was discovered that there may be a more enhanced dust entrapment device that may be used in the system.

The present invention contemplates elimination of drawbacks associated with the prior design and provision of an improved loading system that improves the control over the transfer process for solid particulate matter while improving dust-collection capabilities.

SUMMARY OF THE INVENTION

It is, therefore, an object of the present invention to provide an improved loading system for transferring solid pelletized items from a storage facility to a loading container, while avoiding spreading of dust in the loading area.

It is another object of the present invention to provide an improved loading system for moving solid pelletized items with the help of regulated air pressure from a storage container to a processing tank.

It is a further object of the present invention to provide an assembly for loading pellets of sulfuric acid catalyst, while removing dust generated by the friction of pellets before the dust escapes the loading and transfer conduits.

It is also an object of the present invention to provide a system for delivering solid particulate matter, wherein the dust particles are collected in detachable sleeves mounted in the dust collection vessel.

These and other objects of the present invention are achieved through a provision of a system for delivering solid particulate matter, for instance catalyst pellets for loading. The system comprises a pressurized vessel or container configured for retaining a pre-determined quantity of the solid particulate matter. A source of pressurized gas retains a pre-determined pressure inside the pressurized vessel to facilitate movement of the particulate matter through the container and into a transfer conduit. The pressure inside the container can be manually or automatically controlled using a control panel. The pressure created in the container facilitates movement of the particulate matter through the transfer conduit to a distant end thereof, where a discharge nozzle is mounted.

As the particulate matter moves through the transfer conduit the pellets strike against each other and create dust particles, which must be removed prior to loading of the pellets for processing in a catalytic converter or other tank outside of the system. A balancing vacuum source creates a slight vacuum at the discharge nozzle assembly for removal of the dust particles from the transfer conduit. The removed dust particles are pulled into a dust collection vessel, where they settle on mesh sleeves suspended in the dust collection vessel in the path of flow from the dust collection conduit and an exhaust pump or fan.

Since the dust particles often times contain valuable recyclable material, the dust particles are collected from the mesh sleeves by blowing air through the sleeves using an auxiliary surge tank. The dislodged dust particles fall under gravity into the bottom of the dust collection vessel and are removed therefrom into a container positioned below the dust collection vessel.

The balance between pressurized container and the vacuum pull of the dust particles is maintained to facilitate efficient, dust-free delivery of the palletized material to the desired processing tank.

BRIEF DESCRIPTION OF THE DRAWINGS

Reference will now be made to the drawings, wherein like parts are designated by like numerals, and wherein FIG. 1 is a schematic view of the loading system in accordance with the present invention using manual controls for admitting air into the pressurized container.

FIG. 2 is a cross sectional view of the dust collection vessel taken along lines 2-2 of FIG. 1.

FIG. 3 is a detail view of the dust collection sleeves positioned in the dust collection vessel.

FIG. 4 is a detail view of a trap door at a discharge end of the discharge nozzle.

FIG. 5 is a schematic view of the loading system in accordance with the present invention using automatic controls for admitting air into the pressurized container.

FIG. 6 is a cross sectional view of the dust collection vessel taken along lines 6-6 of FIG. 5.

FIG. 7 is a detail view of the dust collection sleeves positioned in the dust collection vessel of the embodiment of FIG. 5.

FIG. 8 is a detail view of a trap door at a discharge end of the discharge nozzle of the embodiment of FIG. 5.

FIG. 9 is a plan view illustrating movement of the regulating door in conjunction with the discharge nozzle of the transfer conduit.

DETAILED DESCRIPTION OF THE INVENTION

Turning now to the drawings in more detail, the system of the present invention is designated by numeral 10 in FIG. 11. As can be seen in the drawing, the system 10 comprises a pressurized upright container 12 having a bottom discharge 14 in fluid communication with a transfer conduit 16. The transfer conduit 16 is provided with a discharge nozzle assembly 20 at the distant end thereof. A dust removal conduit 22 is in fluid communication with the discharge nozzle assembly 20. The dust conduit 22 is connected to the discharge nozzle assembly 20 upstream from a discharge opening 98 of the discharge nozzle assembly 20. The dust removal conduit 22 is operationally connected to a dust collection container, or vessel 26 and is in fluid communication therewith. A chamber 28 is formed in the dust collection vessel 26.

The pressurized container 12 is provided with a top lid 30 that allows loading of the container 12 from the top. The items to be transferred, for instance pellets 38 of the catalyst, are loaded by gravity into the upright container 12. A conduit 32 fluidly connects the container 12 with a source of compressed (pressurized) air supply (not shown). A regulating valve 33 is mounted in the conduit 32 for regulating delivery of the pressurized air into the container 12. A pressure indicator 35 is operationally connected to the container 12; the pressure indicator 35 is configured to detect pressure inside the container 12 during the loading operation. The container 12 is vertically oriented to facilitate movement of the solid particulate matter loaded into the container 12 from the top 34 to the bottom 36 thereof.

The bottom 36 of the container 12, if desired, can be formed as an inverted cone to facilitate movement of the pelletized solid material in the interior of the container 12 toward to apex of the cone, which serves as a discharge outlet of the container 12. As can be seen in FIG. 1, the solid particles occupy the lower portion of the container 12 with the top portion 34 being filled with pressurized air to push the pellets downwardly and into the discharge 14 and then into the transfer conduit 16. A gate valve 40 is positioned at the interface of the discharge opening 14 and the transfer conduit 16 to regulate movement of solid particles from the container 12 downstream into the transfer conduit 16. The gate valve 40 moves between an open position and a closed position in response to a control signal from a control valve 42 mounted in operational relationship to the air supply conduit 32 and the regulating valve 33.

The container 12 is schematically shown as resting on a plurality of supporting legs 43 to allow the bottom 36 of the container 12 to be elevated above the conduit 16. The height of the supporting legs 43 differs depending on the types of container design used.

The solid pellets 38 move through the bottom discharge 14 into the conduit 16 in the direction away from the container 12. The air pressure at the loading side 15 of the container 12 is approximately 375 CFM pushing the pellets 38 into the container 12. The pressure inside the container 12, maintained by the compressed air supply as detected by the pressure indicator 35 is maintained at a level of between 5 p.s.i. and 15 p.s.i. In one of the preferred embodiments, that pressure is about 8 p.s.i. to start the movement of the pellets 38 from the container 12 into the transfer conduit 16. The pressure at the discharge 14 is maintained at a sufficient level to allow movement of the pellets 38 through the transfer conduit 16 towards the discharge nozzle assembly 20. While the pressure in the transfer conduit 16 and the vessel 12 will necessarily differ depending on the material being transferred by the assembly 10, one of the embodiments of the present invention for transferring sulfuric acid catalysts provides for pressurizing of the vessel 5 to 18 p.s.i. The discharge 14 on the bottom of the container 12 opens once the pre-determined pressure is reached. In one aspect of the invention, a compressor generating up to 400 cubic feet per minute (CFM) is used.

To facilitate capturing of the dust particles and movement of the dust particles into the dust collection vessel 26, the system 10 provides for the use of a vacuum exhaust pump 50 connected to the interior of the dust collection vessel 26. A source of vacuum (not shown) can be a vacuum truck, which is delivered to the site and connected to the vacuum pump 50 by a vacuum delivery conduit 52. A vacuum control valve 54 is mounted in the vacuum delivery conduit 52. An exhaust conduit 56 is connected to the top of the dust collection vessel 26. An exhaust valve 58 is mounted downstream of the exhaust pump 50 in the exhaust conduit 56.

As the pelletized items 38 move through the vessel 12 into the conduit 16, they necessarily strike against each other; the friction causes small particles to be chipped off from the pellets 38, generating dust that also travels through the container 12 and the transfer conduit 16. The tiny solid particles then travel along the transfer conduit 16 and reach the discharge nozzle assembly 20. A slight vacuum of approximately 0 to 5 p.s.i., at the discharge nozzle assembly 20 creates a large expansion of gas to about 3500 CFM. That air travels over the material being transferred through the discharge nozzle assembly 20 such that the dust particles are captured by the vacuum and pulled into the dust removal conduit 22 and then into the dust collection vessel 26.

Sometimes, an operator loading the palletized material 38 into a container, for instance an oil processing vessel (not shown), detects that the pellets 38 exit the discharge nozzle 20 at a greater speed than necessary and that dust content gas increased. Such observation allows the operator to determine that the speed of travel of the palletized material through the transfer conduit 16 is too great. To better regulate the speed of pellets discharge, the system of the present invention provides for the use of a regulating door 60, which moves between a closed and a plurality of partially open positions.

The regulating door 60 is mounted in the discharge nozzle assembly 20 pivoting about a pivot point 62 in the direction of arrow 63. The regulating door 60 can be rectangular in shape, as shown in FIGS. 4 and 8. A knob 64 is secured to an exterior surface 61 of the door 60 to allow the operator to manually pull open the door 60 and thus reduce the vacuum strength pulling the pellets through the discharge conduit 16. The door 60 can be moved into a fully open position or a plurality of partially open positions, giving the operator control over the speed of the pellet discharge at the exit point 98.

As can be seen in FIG. 9, the discharge opening 98 is formed in a discharge nozzle plate 100. The discharge nozzle plate 100 surrounds the discharge opening 98, through which the pellets 38 exit the system 10. The regulating door 60 is formed with an indentation 102 on an inner contact surface 63 thereof. A plurality of spaced-apart raised members 104 is provided on the contact surface of the discharge nozzle plate 100. As any of the raised members 104 is aligned with the indentation 102 an matingly engages therewith, the door 60 opens in the selected position, allowing the discharge opening 98 to be fully closed, partially open or fully open, as the operator chooses.

The dust collection conduit 22 is fluidly connected to an inlet opening 27 formed in the dust collection vessel 26. A plurality of dust collection members 70 is suspended in the dust collection vessel 26 above a dust inlet opening above the inlet opening 27. The dust collection members 70 are suspended in the dust collection vessel 26 in the path of suction flow between the dust collection conduit 22 and the exhaust pump or fan 50.

Each of the dust collection members 70 comprises a frame 72, which can be formed by a thin rod bent into a generally U-shaped configuration. A mesh dust sleeve 74 is stretched over the frame 72 and is detachably secured on top by a clamp or rubber band 76. The mesh sleeve 74 is formed from a porous flexible material with small openings 75 that allow air circulation through the dust sleeve while trapping dust particles on the exterior of the sleeve 74. As the vacuum created by the vacuum source pulls across the interior of the chamber 28 of the dust collection vessel 26, the dust particles settle on the outside of the dust sleeves 74, while the dust-free air exhausts through the exhaust conduit 56. It should be noted that the dust particles may contain valuable materials, for instance silver (Ag), that is used in some catalysts.

The system of the present invention comprises a means for dislodging and capturing or collecting the dust particles for recycling or disposal. As can be seen in FIGS. 1 and 5, a surge tank 80 is operationally connected to a surge conduit 82 mounted across the interior of the chamber 28. The surge tank 80 is connected to a compressed air supply (not shown) through a supply valve 84 and to a control panel 200 of the system 10 through a surge control valve 86.

The surge conduit 82 has channels connecting the surge conduit 82 to the dust collection members 70. As the dust collects on the exterior of the sleeves 74 and the flow of exhaust air through the exhaust conduit 56 decreases, the system operator can detect that the sleeves 74 have collected dust that impedes the air flow through the sleeves. Periodically, the operator can close off the valve into the transfer conduit 16 and switch off the exhaust pump 50. The vacuum valve 54 is closed, thus isolating the dust collection vessel from the remainder of the system. If desired, the closing of the valves and vacuum supply can be performed automatically upon detection of certain pressure across the exhaust conduit 56 using the control panel 200.

The operator then opens the supply of compressed air through the surge tank 80, blowing the compressed air across the interior of the sleeves 74. The dust particles, which have settled on the sleeves 74 are dislodged from the sleeves 74 and fall under gravity into the bottom 29 of the dust collection vessel 26. The dust particles 87 collect in the conical bottom 29 of the vessel 26. The operator can open the bottom door 88 in the bottom portion 29 of the vessel 26 and allow the dust particles 87 to drop into a barrel 89 positioned under the door 88. The collected dust particles containing valuable metals and other materials can be sent to recycling and manufacturing of the catalyst pellets or disposed in a safe manner.

The embodiment of the present invention, system 120, shown in FIGS. 5-8, is rather similar to the embodiment shown in FIGS. 1-5 and 9, except in the system 120, the delivery of compressed air supply into the inlet side of the transfer conduit 16 and into the pellet container 12 is performed automatically without human intervention using the control panel 200. In both embodiments, substantially all dust particles, or a significant amount thereof is diverted from reaching the discharge opening 98 and escaping into the atmosphere. During a catalyst loading operation, the discharge nozzle end 98 is placed in the converter and the catalyst is distributed as required.

The loading assembly of the present invention allows scrubbing of the catalysts or other pelletized solid particles and remove dust from the loading conduits before they escape into the surrounding area or reach the processing vessels, catalytic converters, storage containers, and the like. A careful balance must be observed between the amount of pressure created in the vessel 12 and the dust removal conduit 22. Similarly, if the discharge nozzle 20 is selected for high-speed discharge, the dust particles may not have a chance to be directed into the flow moving towards the conduit 22.

The system 10 and the system 120 allow control of the catalyst being loaded into the container 12 as well as control of the vacuum pull by increasing the revolutions of the exhaust fan or pump 50 so as to create sufficient amount of low pressure at the precise point in the discharge assembly. The dust particles separated from the solid pellets are diverted from the discharge outlet into the dust collection conduit 22 and dust collection vessel 26, thereby allowing the dust particles to be collected, containerized and recycled.

These major control points allow balancing of the loading process and create a virtually dust-free delivery of the catalyst for a chemical reaction outside of the system of the present invention. As the palletized material moves at the selected speed through the transfer conduit, the dust particles are allowed to separate from the palletized material and then redirected from the discharge opening 98 to the dust collector. The timing and speed of travel of the pellets through the systems 10 or 120 allow obtaining maximum separation of the dust particles depending on the size and type of the palletized material.

It should be noted that the vacuum source should not overpower the positive air compressor delivering compressed air through the supply line 32. The pressure in the container 12 is detected and controlled using the pressure indicator 35 so as not to overcome the vacuum force required for proper particle separation. In one aspect of the invention, the inlet pressure of about 5 p.s.i. at the delivery of the pellets into the container 12 and control of the exhaust vacuum fan 50 allows to create the necessary equilibrium for maximum collection of the dust particles without sacrificing the delivery of the palletized material for loading. In one aspect, the dust collection vessel 26 may have a capacity of moving 3,000 cubic feet per minute of the airflow. Of course, the vacuum generated in the conduit 22 and the pressure values in the container 12 can be different for different types of solid particulate matter.

Many changes and modifications can be made in the apparatus of the present invention without departing from the spirit thereof. I, therefore, pray that my rights to the present invention be limited only by the scope of the appended claims.

I claim:

1. A system for delivering solid particulate matter for loading, comprising:
   a pressurized vessel configured for retaining a pre-determined quantity of the solid particulate matter, said pressurized vessel being fluidly connected to a supply of pressurized gas; a means for controlling delivery of pressurized gas into the pressurized vessel operationally connected to the pressurized vessel;
   a transfer conduit configured for transferring the solid particulate matter from the pressurized vessel for loading, said transfer conduit carrying a discharge nozzle assembly with a discharge opening on a distant end thereof, said discharge nozzle assembly having a regulating door with a door contact surface that has an indentation formed therein and a discharge nozzle plate surrounding the discharge opening, the plate being provided with a plurality of raised members extending from a plate contact surface, said regulating door being configured for moving between a closed position and a plurality of selected open positions aligning the indentation with one of the plurality of raised members, said movement of the regulating door regulating speed of delivery of the particulate matter through the discharge opening;
   a pressure indicator means for detecting pressure in the pressurized vessel during loading of the solid particulate matter into the pressurized vessel;
   a means mounted upstream from said discharge opening for removing dust particles from said discharge nozzle assembly, said dust removing means being in fluid communication with a vacuum source, said means for removing dust particles being configured to create suction force sufficient to divert the dust particles from the discharge opening; and
   a control panel operationally connected to the pressurized vessel and the means for removing the dust particles.

2. The system of claim 1, wherein said means for removing dust particles comprises a dust collection vessel operationally connected to an exhaust fan and a vacuum source, and a dust collection conduit mounted in fluid communication between the dust collection vessel and the discharge nozzle assembly.

3. The system of claim 2, wherein said dust collection vessel comprises an interior chamber, and said means for removing dust particles further comprises a plurality of porous dust collection members suspended within the interior chamber.

4. The system of claim 3, wherein each of the dust collection members is configured to retain the dust particles on exterior surface thereof.

5. The system of claim 4, wherein each of the dust collection members comprises a mesh sleeve stretched over an open frame.

6. The system of claim 3, wherein the means for removing the dust particles further comprises a means for dislodging the dust particles settled on the dust collection members.

7. The system of claim 6, wherein the means for dislodging the dust particles settled on the dust collection members comprises a surge tank fluidly connected to the dust collection members, said surge tank being configured to deliver pressurized air through the dust collection members.

8. The system of claim 7, wherein the means for removing the dust particles further comprises a means for collecting the dislodged dust particles.

9. The system of claim 8, wherein the means for collecting the dislodged dust particles comprises a bottom door formed in the dust collection vessel and a container mounted below the bottom door for receiving the dislodged dust particles.

10. The system of claim 6, wherein the means for removing the dust particles further comprises a means for connecting the means for dislodging dust particles to the control panel.

11. The system of claim 1, wherein said pressure indicator means for detecting pressure within the pressurized vessel is operationally connected to the pressurized vessel.

12. The system of claim 11, wherein the means for detecting pressure within the pressurized vessel is manually operated.

13. The system of claim 11, wherein the means for detecting pressure within the pressurized vessel is configured for automatic control by the control panel.

14. The system of claim 1, wherein said pressurized vessel comprises an outlet, said outlet being operationally connected to the means for controlling delivery of pressurized gas into the pressurized vessel.

15. The system of claim 1, wherein said regulating door is pivotally mounted in relation to the discharge nozzle assembly.

16. The system of claim 1 wherein the contact plate is configured for a sealing contact with the regulating door, and wherein, each of the raised members is configured for mating engagement with the indentation in the contact surface of the regulating door.

* * * * *